(12) United States Patent
Borgeat et al.

(10) Patent No.: US 10,518,913 B2
(45) Date of Patent: Dec. 31, 2019

(54) METHODS FOR AUTOMATICALLY FILLING-INFLATING GAS CUSHIONS, NOTABLY AIR CUSHIONS, FOR PACKAGING AND USE THEREOF FOR FILLING AND INFLATING CUSHIONS

(71) Applicants: Guy Borgeat, Vouvry (CH); Glenn Flueckiger, Sion (CH)

(72) Inventors: Guy Borgeat, Vouvry (CH); Glenn Flueckiger, Sion (CH)

( * ) Notice: Subject to any disclaimer, the term of this patent is extended or adjusted under 35 U.S.C. 154(b) by 273 days.

(21) Appl. No.: 15/686,418

(22) Filed: Aug. 25, 2017

(65) Prior Publication Data

US 2017/0349304 A1 Dec. 7, 2017

Related U.S. Application Data

(62) Division of application No. 13/879,672, filed as application No. PCT/CH2011/000253 on Oct. 21, 2011, now Pat. No. 9,764,862.

(30) Foreign Application Priority Data

Oct. 25, 2010 (CH) ........................................ 1757/10

(51) Int. Cl.
*B65B 1/04* (2006.01)
*B29C 65/00* (2006.01)
*B31D 5/00* (2017.01)

(52) U.S. Cl.
CPC ............ *B65B 1/04* (2013.01); *B29C 66/4312* (2013.01); *B31D 5/0073* (2013.01)

(58) Field of Classification Search
CPC .. B31D 5/0039; B31D 5/0065; B31D 5/0073; B31D 5/0069; B31D 5/0086;

(Continued)

(56) References Cited

U.S. PATENT DOCUMENTS 3,389,643 A * 6/1968 Lemcke .................. B29C 65/18
493/194
3,425,887 A * 2/1969 Bowen .................... B29C 65/18
156/518

(Continued)

FOREIGN PATENT DOCUMENTS

CN 101472729 A 7/2009
CN 101723136 A 6/2010

(Continued)

*Primary Examiner* — Nathaniel C Chukwurah
*Assistant Examiner* — Lucas E. A. Palmer
(74) *Attorney, Agent, or Firm* — Brooks Kushman P.C.

(57) ABSTRACT

A machine for automatically inflating air cushions. The cushions have two plastic walls (21; 22) joined together around their periphery to define a closed space. The machine comprises a source of gas under pressure, and two jaws (1; 2) arranged such that they can move on a supporting structure. Each one of the jaws consists of a body (1; 3) each having a plane face (4; 10) of substantially the same shape and surface area, it being possible for the faces to mate against one another in order to clamp between them the walls (21; 22) of a cushion. Each jaw comprises an aspiration channel (6; 7) opening onto its planer face. A first jaw on the inside of its body has a hollow needle (5) able to move relative to the body and capable in a certain position of having its pointed tip outside of the surface of the plane face. A second jaw within its body has a heating element (18) capable, when the two jaws are clamping between them the two walls of a cushion, of heat-welding the two walls together over a certain proportion of their contacting surface.

16 Claims, 5 Drawing Sheets

(58) Field of Classification Search
CPC .............. B29C 66/814; B29C 66/2422; B29C 66/24221; B29C 66/2442; B29C 66/4312; B65B 1/04
USPC ......... 156/583.4, 553, 581, 583.1, 269, 292, 156/308.4, 290; 53/403, 53
See application file for complete search history.

(56) References Cited

U.S. PATENT DOCUMENTS

| | | | | |
|---|---|---|---|---|
| 3,540,186 | A * | 11/1970 | Parvin | B65B 7/162 53/51 |
| 3,750,365 | A * | 8/1973 | Darby, Jr. | B65B 43/26 53/459 |
| 3,773,235 | A * | 11/1973 | Canamero | B65B 9/042 226/112 |
| 3,874,976 | A * | 4/1975 | MacFarland, Jr. | B29C 65/7451 156/515 |
| 3,909,340 | A * | 9/1975 | Solbeck | B29C 65/02 156/500 |
| 3,938,298 | A * | 2/1976 | Luhman | B29C 49/0047 53/403 |
| 4,017,351 | A * | 4/1977 | Larson | B29C 49/0047 156/494 |
| 4,049,854 | A * | 9/1977 | Casey | B29C 65/18 428/72 |
| 4,366,663 | A * | 1/1983 | Grebe | B29C 51/261 425/121 |
| 4,620,895 | A * | 11/1986 | Kato | B29C 53/04 156/204 |
| 4,714,506 | A * | 12/1987 | Yamashiro | B31D 5/0073 156/145 |
| 5,094,707 | A * | 3/1992 | Bruno | B29C 53/10 156/244.15 |
| 5,216,868 | A * | 6/1993 | Cooper | B31D 5/0073 53/472 |
| 5,335,483 | A * | 8/1994 | Gavronsky | B29C 44/182 53/451 |
| 5,337,541 | A * | 8/1994 | Gmuer | B65B 43/30 53/386.1 |
| 5,337,542 | A * | 8/1994 | Omori | B65B 9/067 53/374.5 |
| 5,552,003 | A * | 9/1996 | Hoover | B29C 66/439 156/147 |
| 5,693,163 | A * | 12/1997 | Hoover | B29C 66/439 156/147 |
| 5,873,215 | A * | 2/1999 | Aquarius | B29C 49/0047 53/403 |
| 5,942,076 | A * | 8/1999 | Salerno | B31D 5/0073 156/147 |
| 6,044,628 | A * | 4/2000 | Katayama | B29C 65/3656 53/552 |
| 6,170,227 | B1 * | 1/2001 | Kovacs | B29C 66/8221 53/375.9 |
| 6,260,336 | B1 * | 7/2001 | Motomura | B29C 65/3656 53/551 |
| 6,276,532 | B1 * | 8/2001 | Sperry | B29C 65/342 206/522 |
| 6,508,901 | B2 * | 1/2003 | Miller | B29C 65/02 156/227 |
| 6,536,183 | B1 * | 3/2003 | Brown | B65G 51/02 53/250 |
| 6,569,283 | B1 * | 5/2003 | Sperry | B29C 65/342 156/580 |
| 6,758,026 | B2 * | 7/2004 | Davey | B65B 9/13 53/403 |
| 6,789,376 | B1 * | 9/2004 | Greenwood | B31D 5/0073 53/468 |
| 6,889,739 | B2 | 5/2005 | Lerner et al. | |
| 6,955,846 | B2 * | 10/2005 | Lerner | B29C 65/18 428/166 |
| 7,067,025 | B2 | 6/2006 | Borgeat | |
| 7,089,714 | B2 * | 8/2006 | Thomas | B31D 5/0073 53/374.8 |
| 7,240,468 | B2 | 7/2007 | Tanaka et al. | |
| 7,325,377 | B2 * | 2/2008 | Fuss | B31D 5/0073 53/403 |
| 7,429,304 | B2 * | 9/2008 | McNamara, Jr. | B31D 5/0073 156/145 |
| 7,444,795 | B2 * | 11/2008 | Yasuhira | B65B 43/465 53/133.2 |
| 8,181,428 | B2 * | 5/2012 | Gustafsson | B65B 61/14 53/134.1 |
| 8,745,960 | B2 * | 6/2014 | Kannankeril | B31D 5/0073 53/284.7 |
| 2004/0200561 | A1 * | 10/2004 | Lerner | B29C 49/58 156/145 |
| 2004/0216429 | A1 * | 11/2004 | Tanaka | B31D 5/0073 53/472 |
| 2005/0077004 | A1 * | 4/2005 | Borgeat | B31D 5/0073 156/285 |
| 2006/0042189 | A1 * | 3/2006 | Oswald | B65B 43/30 53/403 |
| 2006/0090421 | A1 * | 5/2006 | Sperry | B29C 65/02 53/403 |
| 2006/0229180 | A1 * | 10/2006 | Hashimoto | B65B 51/306 493/287 |
| 2006/0292320 | A1 * | 12/2006 | Greenwood | B29C 65/18 428/34.1 |
| 2007/0068118 | A1 * | 3/2007 | Forss | B65D 75/563 53/403 |
| 2008/0014389 | A1 * | 1/2008 | Wehrmann | B31D 5/0073 428/35.2 |
| 2008/0066852 | A1 * | 3/2008 | Wetsch | B29C 65/18 156/147 |
| 2009/0217626 | A1 * | 9/2009 | Kemp | A61L 2/07 53/407 |
| 2009/0313956 | A1 * | 12/2009 | Martinez Sampedro | B29C 51/082 53/559 |
| 2010/0050571 | A1 * | 3/2010 | Birkle | B31D 5/0073 53/266.1 |
| 2010/0251668 | A1 * | 10/2010 | Sperry | B31D 5/0073 53/403 |
| 2011/0024055 | A1 * | 2/2011 | Chiang | B29C 65/222 156/497 |
| 2011/0048634 | A1 * | 3/2011 | Kim | B29C 65/18 156/285 |
| 2011/0172072 | A1 * | 7/2011 | Wetsch | B31D 5/0073 493/227 |
| 2011/0247725 | A1 * | 10/2011 | Frayne | B31D 5/0073 141/10 |
| 2012/0231940 | A1 * | 9/2012 | Tan | B31D 5/0073 493/186 |
| 2014/0260094 | A1 * | 9/2014 | Wehrmann | B65B 55/00 53/403 |
| 2016/0122112 | A1 * | 5/2016 | Nevo | B31D 5/0073 141/4 |
| 2016/0235212 | A1 * | 8/2016 | Krtek | A47C 27/064 |

FOREIGN PATENT DOCUMENTS

| | | | | |
|---|---|---|---|---|
| EP | 0553027 A | | 7/1993 | |
| EP | 0553027 A1 * | | 7/1993 | ........... B65D 81/052 |
| WO | 9535246 A1 | | 12/1995 | |
| WO | WO-9535246 A1 * | | 12/1995 | ........... B31D 5/0073 |
| WO | 9713636 A1 | | 4/1997 | |
| WO | WO-9713636 A1 * | | 4/1997 | ......... B29C 49/0047 |
| WO | 9961232 A1 | | 12/1999 | |
| WO | 0214156 A1 | | 2/2002 | |
| WO | WO-0214156 A1 * | | 2/2002 | ........... B31D 5/0073 |

* cited by examiner

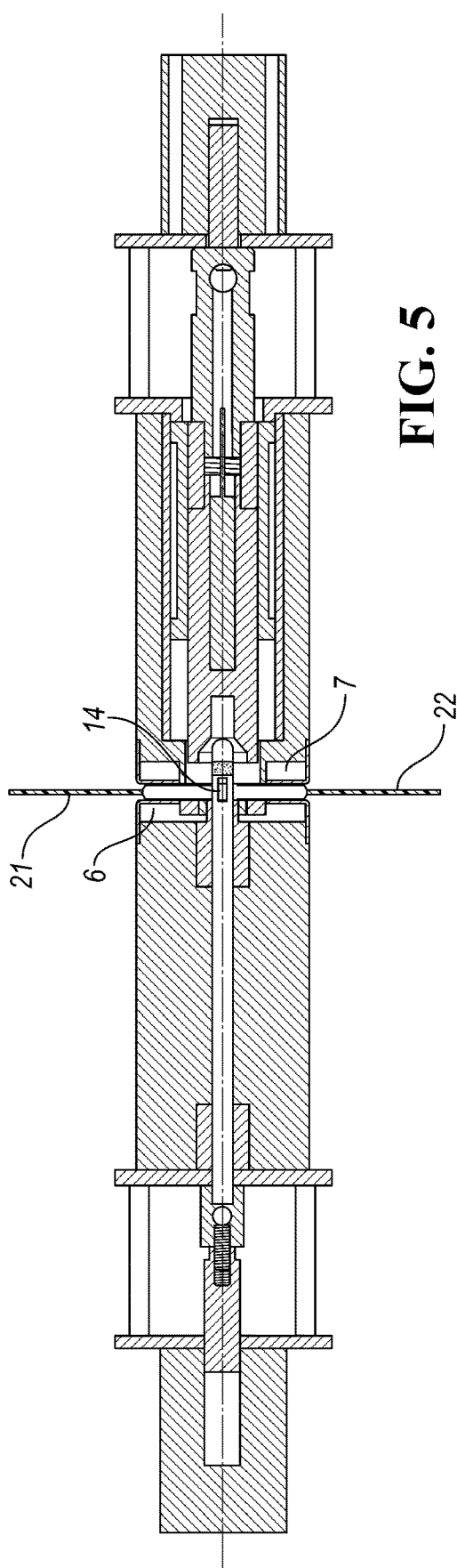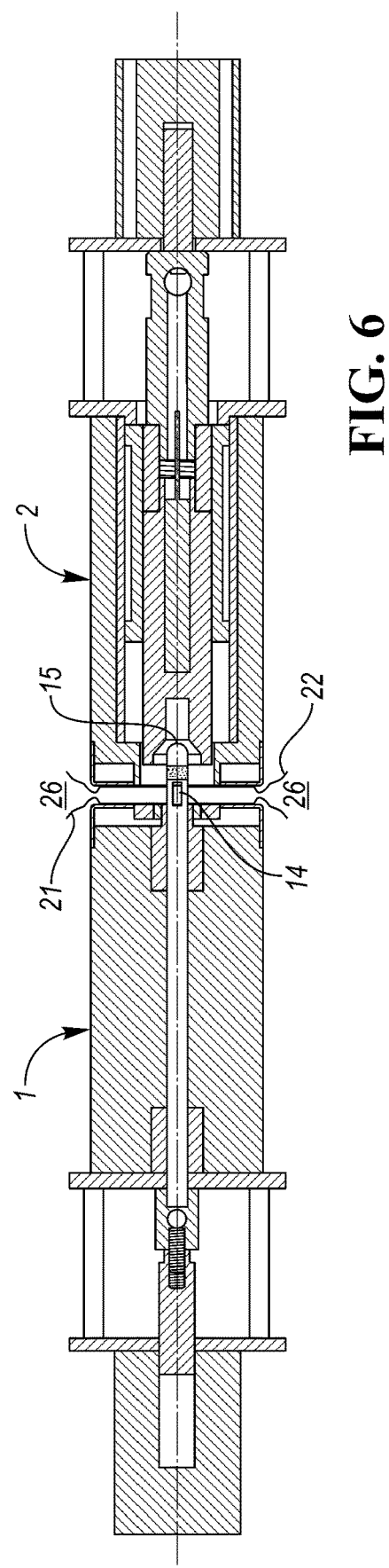

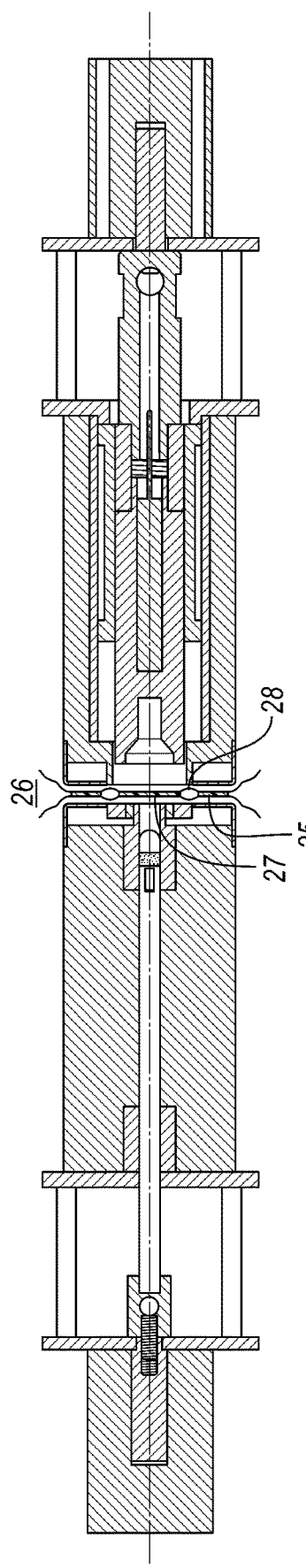
FIG. 9
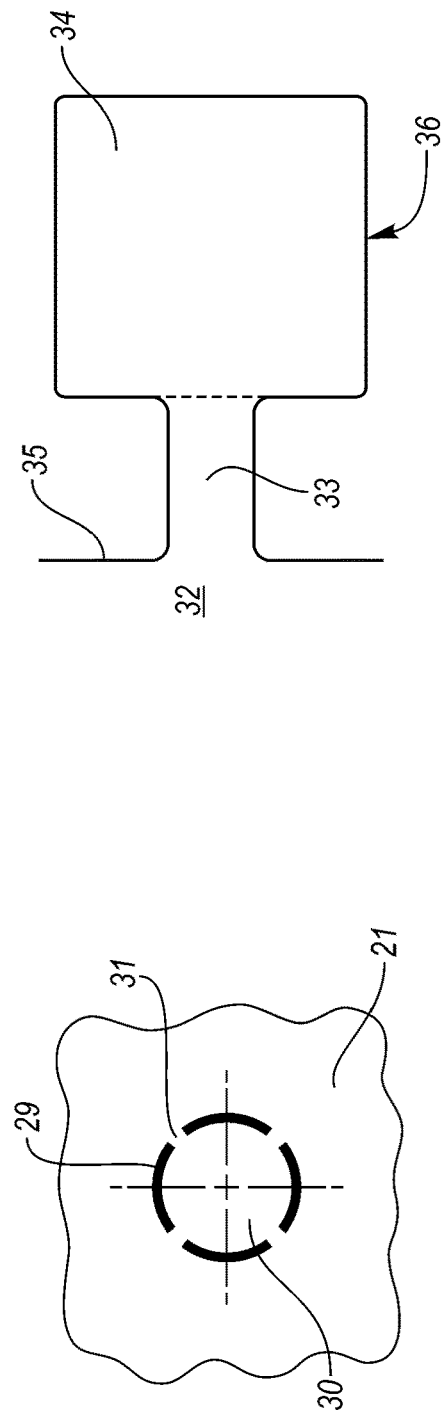
FIG. 11
FIG. 10

METHODS FOR AUTOMATICALLY FILLING-INFLATING GAS CUSHIONS, NOTABLY AIR CUSHIONS, FOR PACKAGING AND USE THEREOF FOR FILLING AND INFLATING CUSHIONS

CROSS-REFERENCE TO RELATED APPLICATIONS

This application is a Divisional Application of prior U.S. application Ser. No. 13/879,672, filed Apr. 16, 2013, now U.S. Pat. No. 9,764,862 issued on Sep. 19, 2017 which is a 371 U.S. National Stage of International Application No. PCT/CH2011/000253, filed Oct. 21, 2011, which claims priority to Swiss Patent Application No. 1757/10, filed Oct. 25, 2010, the contents of which are hereby incorporated by reference in their entirety as if fully set forth herein.

The subject of the present invention is a machine for automatically inflating/filling gas cushions, notably air cushions, for packaging, and its use for inflating and filling cushions. Notably to protect delicate and fragile objects against impacts.

Currently, delicate and fragile objects are packaged in cardboard boxes containing particles of expanded polystyrene or shells of expanded polystyrene or other materials. These products generate a large volume of waste which must be destroyed after use. Air-filled cushions are also used for immobilizing objects in the cardboard boxes as a replacement for polystyrene particles. However, the cushions used for immobilizing do not sufficiently protect said objects against impacts. Air cushions have therefore been invented making it possible to surround said objects in one or more air cushions. The latter cushions comprise at least one valve allowing an appropriate inflation, that is to say an inflation of a pressure higher than those previously achieved for immobilization. Document EP 0553027 describes an inflatable cushion of the type defined above.

The inflatable cushions with valves have several drawbacks, notably the valve comprises the risk of leaks and of causing the pressure in the said cushion(s) to reduce, in addition manual inflating takes time.

The objects of the invention are to provide a machine for automatically inflating and filling cushions, notably air cushions, for packaging, and its use for inflating and filling cushions, that is to say a method which requires no human intervention and which does not have the drawbacks of the known methods.

These objects are achieved with the machine for automatically inflating and filling cushions with gas, notably air cushions, for packaging, according to the invention defined in claim 1 and its use defined in claim 4.

The invention will be better understood, its features and its advantages will appear more clearly, on reading the detailed description of forms of execution, given only as an example and made with reference to the appended drawings, in which:

FIG. 5 represents the jaws of FIG. 1 separated, allowing the cushion to be inflated.

FIG. 6 represents the jaws of FIG. 1 separated at the time of inflation of the cushion.

FIG. 9 represents the jaws of FIG. 1 separated at the time of the release of the cushion from the machine.

FIG. 10 represents on a cushion a circular space defined by a discontinuous weld.

FIG. 11 represents a protuberance relating to a particular shape of a cushion.

In all of the figures, the same reference symbols will be used to indicate the same features.

With reference to FIGS. 1 to 9, only the jaws of one machine have been shown, according to a form of execution of the present invention, for the inflation and filling of an air cushion, because all the other elements of the machine are known and within the scope of those skilled in the art. It has also been considered that the two walls of a cushion consist of two sheets of plastic film.

Figure 1:
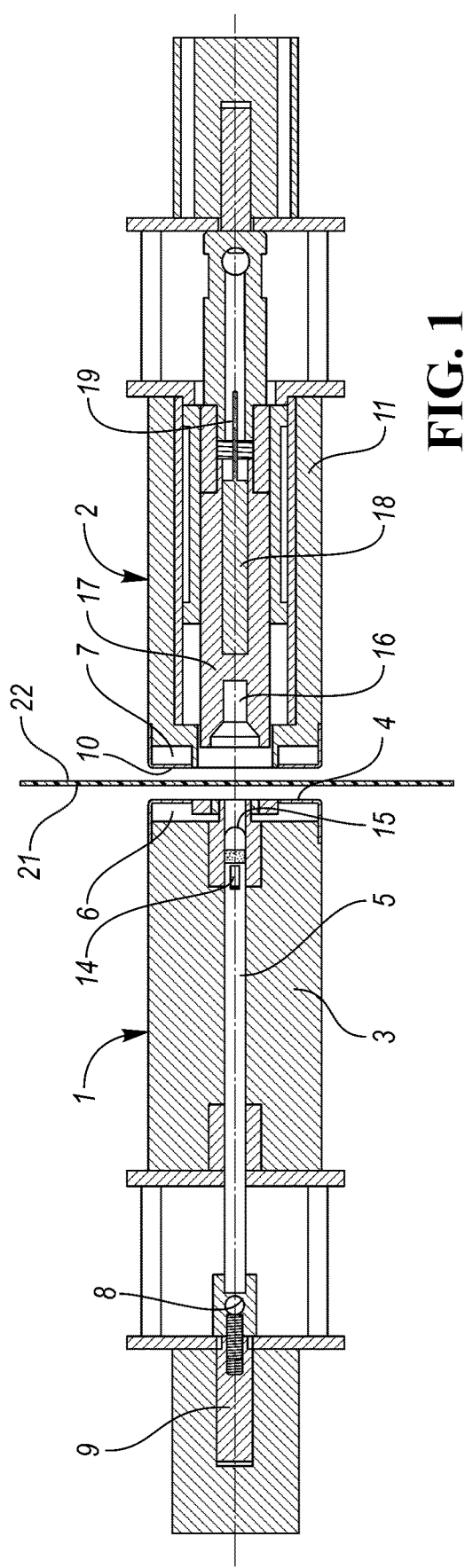
FIG. 1 represents a form of execution of the jaws of a machine according to the invention.
Figure 2:
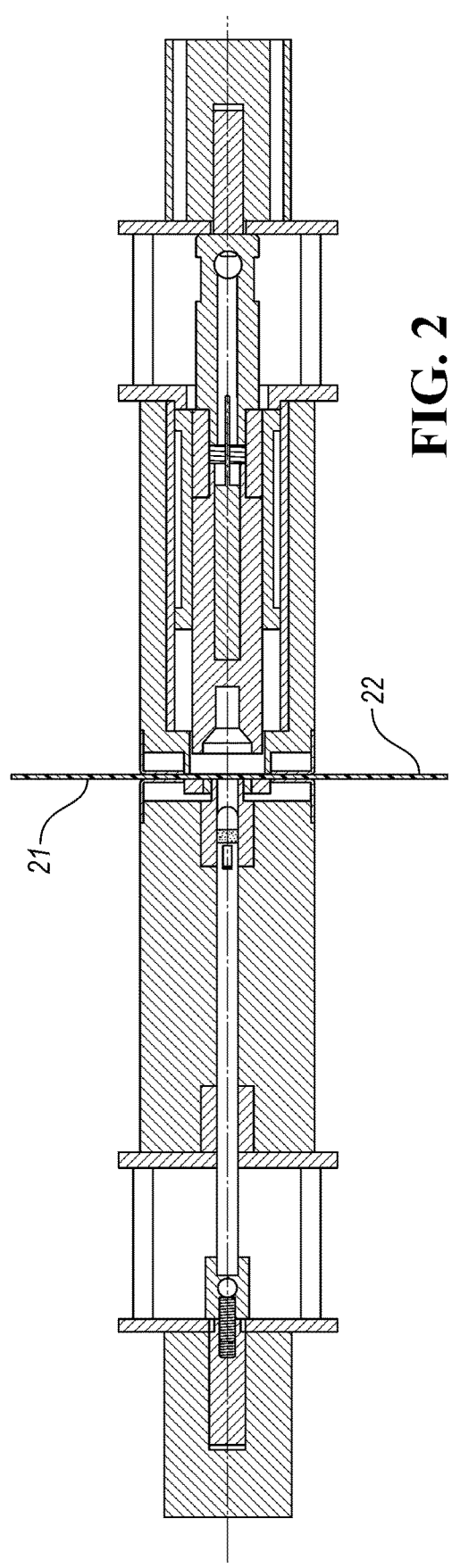
FIG. 2 represents the jaws of FIG. 1 clamping the walls, plastic film, of an uninflated cushion.
Figure 3:
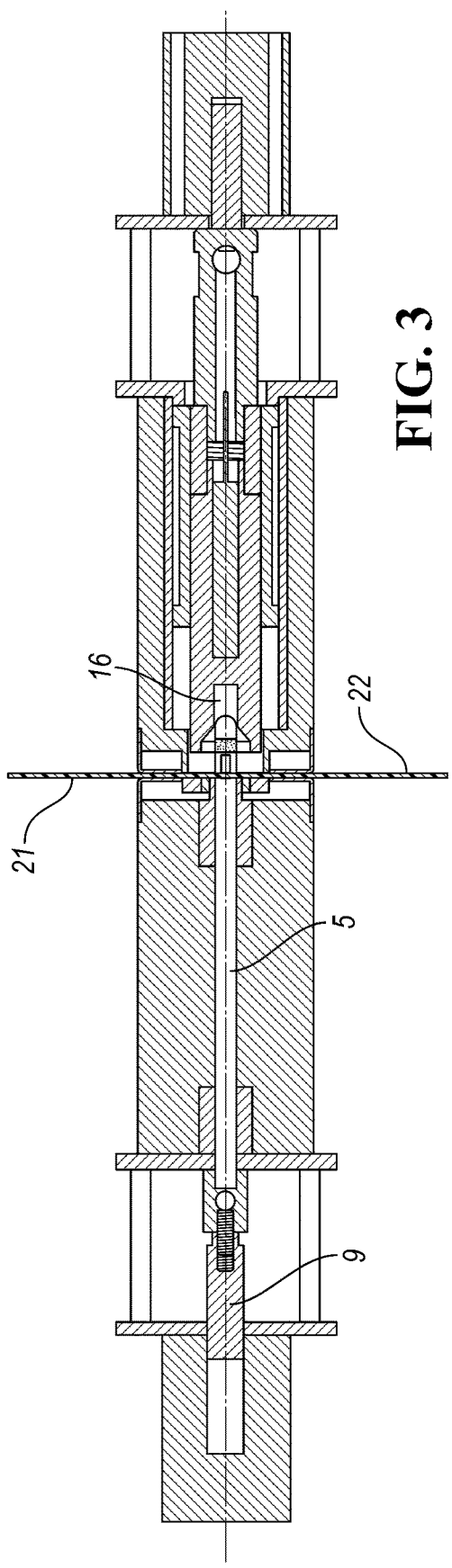
FIG. 3 represents the jaws of FIG. 1 during the piercing of the walls.
Figure 4:
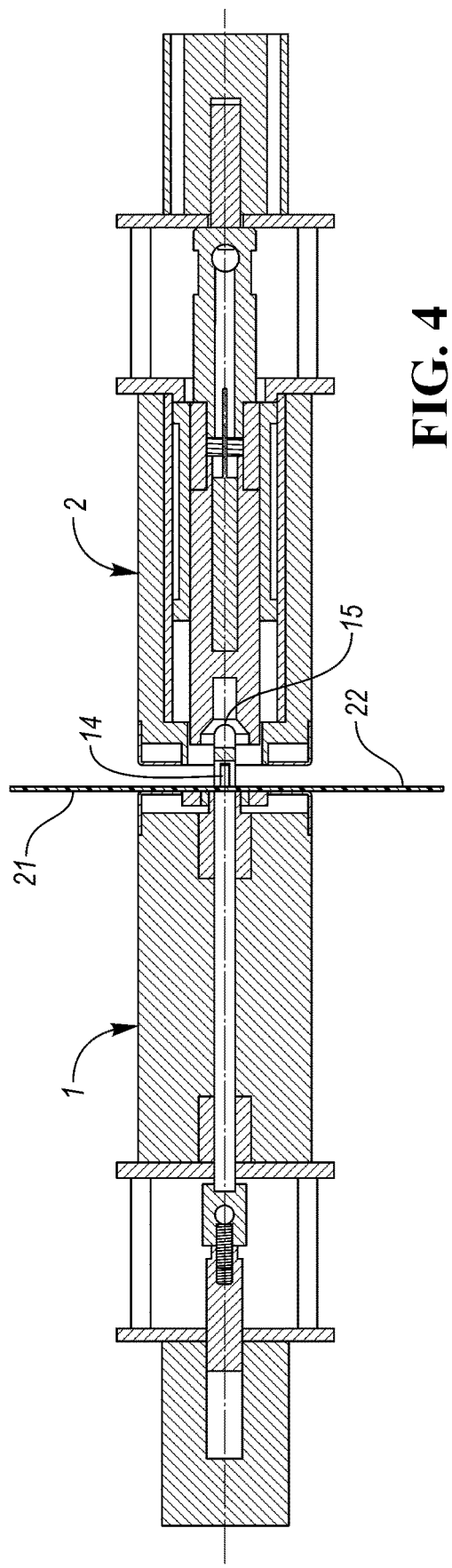
FIG. 4 represents the jaws of FIG. 1 separated at the time of a first jet of air being used to unstick the two walls of plastic film.

As can be seen in FIG. 1, the two jaws 1 and 2 are mounted on the frame, not shown, of a machine according to the present invention. The jaw 1, mounted movably on the frame of the machine, consists of a cylinder 3, inside which a hollow needle 5 is placed that can move in the direction of the axis of the cylinder 3. Said needle 5 is moved, in the case shown, by a piston 9, but it could also be moved by an electromagnet or any other means. Between the needle 5 and the piston 9 a flexible pipe 8 is provided carrying pressurized air to the inside of the needle 5. The distal end of the needle has a point 15 of which the air outlet is obstructed, while behind the point 15 the needle comprises by two (or a different number) lateral openings 14, designed to inject the air into the cushion (see FIG. 5). The jaw 2 consists of a cylinder 11 retained movably on the frame, not shown. The cylinders 3 and 11 can move longitudinally so that their terminal faces 4 and 10 can come into contact (see FIG. 2). The cylinder 11 contains a cylindrical part 17 concentric with the cylinder 11. Inside said part 17 an electrical heating body 18 is placed powered by an electrical cable 19. At its near end of the cylinder 3 the cylinder 11 has a cavity 16 designed to receive the point 15 of the needle 5. The two ends of the cylinders 3 and 11 face to face have a ring of openings in communication with an aspiration/suction device respectively through aspiration channels 6 and 7 placed in the cylinders 3 and 11.

Figure 7:
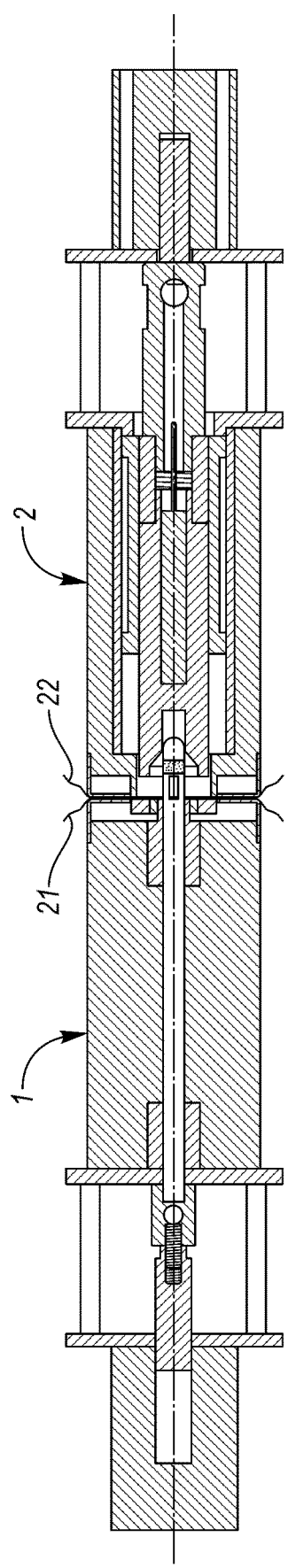
FIG. 7 represents the jaws of FIG. 1 clamping the walls of the inflated cushion.

A use of a machine according to the invention defined in claim 2 proceeds in the following manner:
a) the two walls 21 and 22 of a cushion, uninflated, of any shape, for example square, round, having several pockets connected together, are inserted between the jaws 3 and 11 of the machine as shown in FIG. 1.
b) The two jaws 1 and 2 are moved so as to clamp between their terminal faces 4 and 10 the two sheets of plastic forming the walls of the cushion (see FIG. 2).
c) The needle 5 of the jaw 1 is moved longitudinally perforating the two walls 21 and 22 and placing itself in the cavity 16 of the jaw 2 (see FIG. 3).
d) The two jaws 1 and 2 are moved away slightly and a jet of pressurized air is injected through the lateral openings 14 of the needle 5 so as to unstick the two films 21 and 22 forming the walls of the cushion (see FIG. 4).
e) The two jaws are reclamped, then the aspiration device is activated in the channels 6 and 7, placed in rings about openings allowing the needle to pass, and keep the two walls 21 and 22 stuck to the ends of the cylinders 3 and 11. The pressurized air is injected into the cushion through the openings 14 inflating the latter (see FIGS. 5 and 6).

f) The jaws 1 and 2 are brought together clamping the two walls 21 and 22 between them while compressing the air contained in the cushion (see FIG. 7).

g) The cylinder 17 contained in the body 11 of the jaw 2 is moved so as to press on the periphery of the outlet orifice of the needle 5 of the body 3. The heating element 18 is activated, heat-sealing the two walls along a ring surrounding the hole of the needle 5 preventing the air from leaving the cushion (see FIG. 8).

Figure 8:
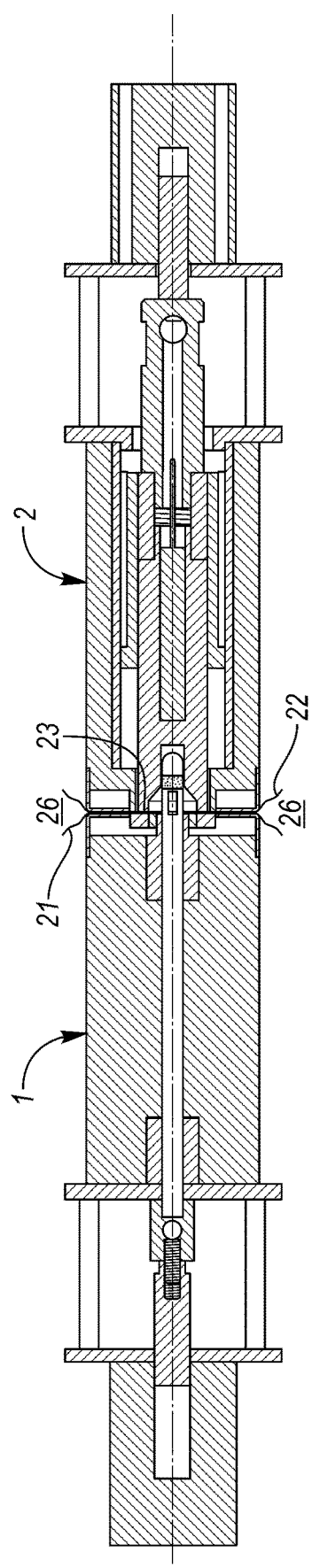
FIG. 8 represents the jaws of FIG. 1 at the time of the heat-sealing of the walls.

As can be easily seen in FIG. 8, the surface area of contact between the two jaws 1 and 2 is larger than the heat-sealed zone, therefore, when the jaws are separated to release the cushion from the machine, the zone 23 represents a ring where the two walls are not stuck, and will be separated from one another thus causing a reduction of the pressure in the cushion.

In order to remedy this defect, provision has been made in another form of execution of the use of the machine to provide cushions having at least one location where the two walls are partly heat-sealed defining a space in communication with the rest of the volume included between the two walls. As is seen in FIG. 10, this space is circular, defined by circularly arcuate welds. But this space could have another shape, for example polygonal, square, triangular, the only condition and that the weld line is not continuous so as to remain in communication with the rest of the volume included between the two walls.

FIG. 9 shows the two jaws separated releasing a cushion from the machine, which cushion is inflated according to the last use described above. Note that the heat-sealed zone 27 where the two walls are welded comprises on its periphery a taurus-shaped zone 28 having zones 25, 29 in FIG. 10 where the two walls are welded, the zones 25, respectively 29 (see FIG. 10) are not continuous, hence the inside of the taurus is at the same pressure as the inside 26 of the cushion. In other words, the two walls in the welding zone are able to separate only slightly, which causes only a very slight loss of pressure in the cushion.

In another form of execution of the use of a machine according to the invention, cushions are used that consist of two walls (plastic films) defining a closed space trapping a small quantity of air preventing the two walls from sticking. The latter operation having been carried out previously before entering the machine according to the invention, for example on another machine, known to those skilled in the art. The use proceeds in the following manner:

A) The two walls of a cushion having two walls that are not stuck together are positioned.

B) The two jaws are moved so as to clamp between their terminal faces the two sheets of plastic forming the walls of the cushion.

C) The aspiration device is activated in the channels placed in rings on the terminal faces of the two bodies forming the jaws. The two walls are then kept separated, stuck against said faces.

D) A needle contained in the body of the machine having an opening at its point and moved so as to pierce only the first wall while leaving the other intact.

E) The pressurized air is injected into the cushion inflating the latter.

F) The jaws are brought together clamping the two walls between them while compressing the air contained in the cushion.

G) In the same manner as in the use described above, the cylinder 17 contained in the body 11 of the jaw 2 is moved so as to press on the periphery of the orifice for the needle 5 to exit the body 3. The heating element is activated heat-sealing the two walls along a ring surrounding the hole of the needle preventing the air from leaving the cushion. And the use (method) ends like that previously described with respect to FIG. 9.

In yet another form of execution of a machine according to the invention for inflating cushions, on which a hole has already been made in at least one of the walls, the use will proceed in the following manner:

A) The two walls of a cushion are placed between the jaws so that the hole is placed opposite the outlet orifice of the needle in the face of one of the bodies.

B) The suction device is actuated, the two jaws are separated each keeping one of the walls stuck against them.

D) The pressurized gas is then injected into the cushion through the outlet orifice of the needle provided in the terminal face of one of the jaws without the needle being moved.

The rest of the process then unfolds as described above.

It is also possible to design variants of use in which the cushion is pierced in any location, for example in a corner, or in which the cushion has a protuberance 36 (see FIG. 11) relative to its general shape, the inside 34 of said protuberance being connected to its general volume 36 of said cushion by a duct 33 that will be closed by heat-sealing 37. As can be seen in FIG. 11, a protuberance 36 is attached to the general volume 32 of a cushion by a duct 33, the two films forming the cushion being welded along the line 35.

As can be seen, all the operations described above require no human intervention. Moreover, it is possible to inflate cushions to a higher pressure than by the methods known hitherto. Finally, the piercing can be carried out at any location on the cushion, for example in a corner, in the middle, at an edge, and it is possible to inflate any shape of cushion, even having several pockets communicating with one another. The cushions obtained by a method according to the invention are more inflated, hence more rigid and can, in certain cases, replace the polystyrene shells. The inflation pressure may vary depending on the strength and the thickness of the sheets forming the walls.

The invention claimed is:

1. A method for inflating a cushion comprising:
    clamping at least a first wall and a second wall of the cushion between a first terminal face of a first jaw and a second terminal face of a second jaw;
    axially moving a needle within a cylinder of the first jaw to perforate at least one of the first wall and the second wall of the cushion;
    aspirating gas through a first aspiration channel disposed within the first jaw adjacent to the first terminal face of the first jaw;
    aspirating gas through a second aspiration channel disposed within the second jaw adjacent to the second terminal face of the second jaw;
    injecting pressurized gas through the needle; and
    activating a heating element disposed within the second jaw to heat-seal the first wall to the second wall.

2. The method of claim 1, further comprising:
    axially moving the heating element relative to the second terminal face of the second jaw.

3. The method of claim 1, wherein injecting pressurized gas through the needle comprises:
    prior to aspirating gas through the first and second aspiration channels, injecting a first jet of pressurized gas through the needle to separate the first wall and the second wall; and while aspirating gas through the first and second aspiration channels, injecting a second jet of pressurized gas through the needle to inflate the cushion.

4. The method of claim 1, further comprising:
separating the first and second jaws while aspirating gas through the first and second aspiration channels.

5. The method of claim 1, wherein axially moving the needle comprises axially moving the needle to perforate at least one of the first wall and the second wall adjacent a periphery of the cushion; and
wherein activating the heating element comprises activating the heating element to heat-seal the first wall to the second wall along a line connecting two portions of the periphery of the cushion to form a triangular region.

6. The method of claim 1, wherein prior to clamping, the method includes:
positioning the cushion between the first jaw and the second jaw, wherein the first wall and the second wall of the cushion are linked together about their peripheries to define a closed space.

7. The method of claim 6, wherein the closed space includes a quantity of air trapped between the first wall and the second wall.

8. The method of claim 6, wherein the first wall and the second wall are linked at a discontinuous weld zone formed within the peripheries of the first wall and the second wall, the discontinuous weld zone defining a space in communication with a remaining volume of the cushion.

9. The method of claim 8, wherein axially moving the needle comprises:
axially moving the needle to perforate at least one of the first wall and the second wall within the discontinuous weld zone, wherein the needle includes an opening at a distal end of the needle.

10. The method of claim 8, wherein activating the heating element comprises:
activating the heating element to heat-seal the first wall to the second wall within the discontinuous weld zone.

11. The method of claim 6, wherein the peripheries of the first wall and the second wall define a protuberance, and wherein an interior of the protuberance forms a portion of the closed space.

12. The method of claim 11, wherein axially moving the needle comprises:
perforating at least one of the first wall and the second wall at the protuberance.

13. The method of claim 11, wherein injecting pressurized gas through the needle comprises:
injecting pressurized gas through a lateral opening in a wall of the needle.

14. The method of claim 11, wherein activating the heating element seals the first wall to the second wall proximate the protuberance.

15. The method of claim 14, wherein activating the heating element seals the first wall to the second wall proximate the protuberance along a straight line to separate the interior of the protuberance from a general volume of the cushion.

16. A method for inflating a cushion comprising:
positioning a cushion between a first jaw and a second jaw, the cushion including a first wall and a second wall linked together at their peripheries, at least one of the first wall and the second wall defining a preformed hole disposed therethough;
positioning an outlet orifice of the first jaw adjacent to the preformed hole;
aspirating gas through a first aspiration channel disposed within the first jaw adjacent to the first terminal face of the first jaw;
aspirating gas through a second aspiration channel disposed within the second jaw adjacent to the second terminal face of the second jaw;
injecting pressurized gas through the outlet orifice of the first jaw; and
activating a heating element disposed within the second jaw to heat-seal the first wall to the second wall.

* * * * *